US008707700B2

(12) United States Patent
Sasanuma et al.

(10) Patent No.: US 8,707,700 B2
(45) Date of Patent: Apr. 29, 2014

(54) CARBON DIOXIDE RECOVERY METHOD AND CARBON-DIOXIDE-RECOVERY-TYPE STEAM POWER GENERATION SYSTEM

(75) Inventors: Takeshi Sasanuma, Yokohama (JP); Nobuo Okita, Ushiku (JP); Takeo Takahashi, Yokohama (JP); Mikio Takayanagi, Tokyo (JP); Takeo Suga, Yokohama (JP); Yuya Murakami, Tokyo (JP); Toshihisa Kiyokuni, Yokohama (JP); Hideo Kitamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 273 days.

(21) Appl. No.: 13/277,803

(22) Filed: Oct. 20, 2011

(65) Prior Publication Data
US 2012/0096863 A1    Apr. 26, 2012

(30) Foreign Application Priority Data
Oct. 21, 2010   (JP) .................................. 2010-236523

(51) Int. Cl.
    *F01K 7/34*         (2006.01)
    *B01D 53/62*        (2006.01)
(52) U.S. Cl.
    USPC .................. 60/653; 60/677; 60/679; 423/220
(58) Field of Classification Search
    USPC ............ 60/646, 653, 657, 677–679; 110/215, 110/234; 96/236; 423/220
    See application file for complete search history.

(56) References Cited

U.S. PATENT DOCUMENTS

| 5,344,627 | A  | * | 9/1994 | Fujii et al. ...................... 423/220 |
| 5,700,437 | A  | * | 12/1997 | Fujii et al. ...................... 423/220 |
| 6,174,506 | B1 | * | 1/2001 | Chakravarti et al. .......... 423/220 |
| 7,485,274 | B2 | * | 2/2009 | Kamijo et al. ................. 423/220 |
| 7,488,463 | B2 | * | 2/2009 | Iijima et al. .................... 423/220 |
| 2007/0256559 | A1 | | 11/2007 | Chen et al. |

FOREIGN PATENT DOCUMENTS

| CN | 101472662 A | 7/2009 |
| CN | 101666248 A | 3/2010 |
| EP | 1473072 A1 | 11/2004 |

(Continued)

OTHER PUBLICATIONS

Japanese Office Action dated Mar. 4, 2014, filed in Japanese counterpart Application No. 2010-236523, 6 pages (with translation).

(Continued)

*Primary Examiner* — Hoang Nguyen
(74) *Attorney, Agent, or Firm* — Patterson & Sheridan, LLP

(57) ABSTRACT

According to one embodiment, a carbon-dioxide-recovery-type steam power generation system comprises a boiler that generates steam and an exhaust gas, an absorption tower that allows carbon dioxide contained in the exhaust gas to be absorbed in an absorption liquid, a regeneration tower that discharges a carbon dioxide gas from the absorption liquid supplied from the absorption tower, a reboiler that heats the absorption liquid of the regeneration tower, a turbine that is rotationally driven by the steam, a first condenser, a second condenser, and a desuperheater. The first condenser generates condensate by cooling steam exhausted from the turbine. The second condenser condenses the carbon dioxide gas while using a part of the condensate as cooling water, and generates hot water.

The desuperheater lowers the temperature of the steam exhausted from the turbine by spraying the hot water, and supplies the steam at lowered temperature to the reboiler.

7 Claims, 1 Drawing Sheet

(56) References Cited

FOREIGN PATENT DOCUMENTS

| | | |
|---|---|---|
| JP | H05184868 A | 7/1993 |
| JP | 08-257355 | 10/1996 |
| JP | 2004-323339 | 11/2004 |
| JP | 2005127638 A | 5/2005 |

OTHER PUBLICATIONS

Chinese Office Action dated Nov. 28, 2013, filed in Chinese counterpart Application No. 201110322365.2, 13 pages (with translation).

* cited by examiner

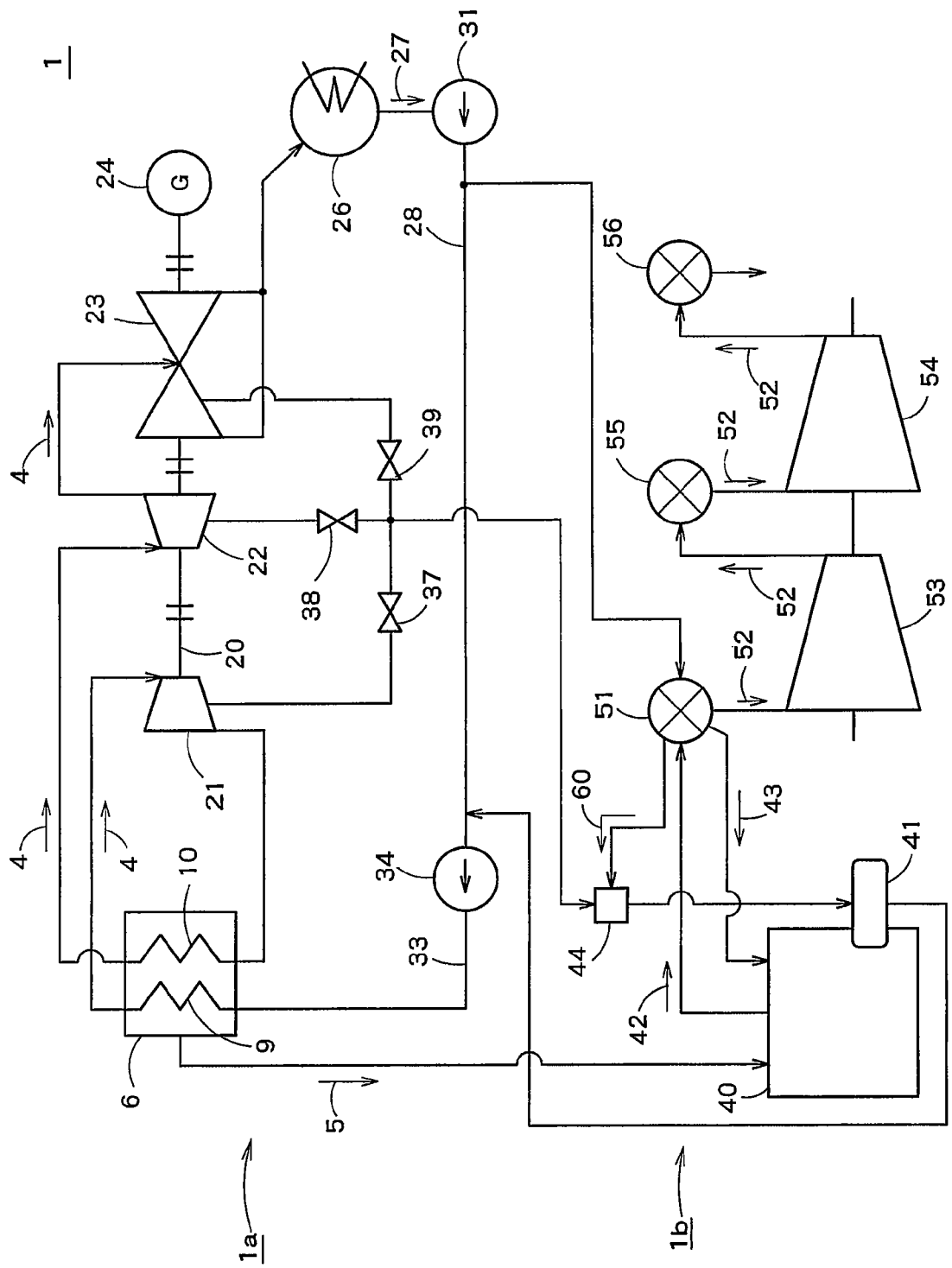

CARBON DIOXIDE RECOVERY METHOD AND CARBON-DIOXIDE-RECOVERY-TYPE STEAM POWER GENERATION SYSTEM

CROSS REFERENCE TO RELATED APPLICATION

This application is based upon and claims benefit of priority from the Japanese Patent Application No. 2010-236523, filed on Oct. 21, 2010, the entire contents of which are incorporated herein by reference.

FIELD

Embodiments described herein relate generally to a carbon dioxide recovery method and a carbon-dioxide-recovery-type steam power generation system.

BACKGROUND

In a power generation system such as a thermal power plant using a large amount of fossil fuel, an amine absorption method is employed as a method of removing and recovering carbon dioxide that is one of causes of global warming. However, in the amine absorption method, thermal energy obtained from a great amount of steam having low pressure (for example, about 0.3 MPa) is required to regenerate an absorption liquid having absorbed carbon dioxide.

In order to compensate this thermal energy, there is proposed a method of joining condensate, which is branched from a turbine condensate system, to a deaerator after performing heat exchange between the amount of heat of regenerated carbon dioxide and heat generated by compressing carbon dioxide to high pressure (for example, about 8 MPa) that is suitable for injecting carbon dioxide into the ground.

However, there has been a problem in that the amount of condensate is not enough to recover the total amount of heat of carbon dioxide. As a result, the amount of condensate flowing in a low-pressure heater is reduced and the amount of gas extracted from a turbine is reduced, so that the amount of heat dumped to a condenser is increased and the effect of a regeneration cycle in the related art is decreased. For this reason, there has been a problem in that the output of the turbine is not particularly increased by the amount of recovered heat. The power generation system needs to have high thermal efficiency.

BRIEF DESCRIPTION OF THE DRAWINGS

FIG. 1 is a view showing the schematic structure of a carbon-dioxide-recovery-type steam power generation system according to an embodiment.

DETAILED DESCRIPTION

According to one embodiment, carbon-dioxide-recovery-type steam power generation system comprises a boiler that generates steam through the combustion of fuel and generates an exhaust gas, an absorption tower that is supplied with the exhaust gas from the boiler, and allows carbon dioxide contained in the exhaust gas to be absorbed in an absorption liquid, a regeneration tower that is supplied with the absorption liquid having absorbed carbon dioxide from the absorption tower, discharges a carbon dioxide gas from the absorption liquid, and discharges the carbon dioxide gas, a reboiler that heats the absorption liquid discharged from the regeneration tower and supplies generated steam to the regeneration tower, a turbine that is supplied with steam from the boiler and is rotationally driven, a first condenser, a second condenser, and a desuperheater. The first condenser generates condensate by cooling steam exhausted from the turbine. The second condenser is supplied with a part of the condensate as cooling water, condenses the carbon dioxide gas, and generates hot water. The desuperheater is supplied with the hot water, lowers the temperature of the steam exhausted from the turbine by spraying the hot water on the steam, and supplies the steam of which the temperature is lowered to the reboiler.

Embodiments will now be explained with reference to the accompanying drawings.

FIG. 1 shows the entire structure of a carbon-dioxide-recovery-type steam power generation system according to an embodiment. The carbon-dioxide-recovery-type steam power generation system 1 includes a steam power generation plant 1a and a carbon dioxide recovery plant 1b. The steam power generation plant 1a generates turbine steam 4 through the combustion of fuel and generates power by rotationally driving a turbine. The carbon dioxide recovery plant 1b recovers carbon dioxide from an exhaust gas 5, which is generated in a boiler 6, by using an absorption liquid that absorbs carbon dioxide contained in the exhaust gas 5.

The boiler 6 is supplied with fuel and air for combustion and fuel is combusted in a furnace, so that turbine steam 4 and the exhaust gas 5 are generated. The boiler 6 includes a superheater 9 and a reheater 10. The superheater 9 generates main steam by heating the turbine steam 4 through the combustion in the furnace. The reheater 10 is provided adjacent to the superheater 9, and generates reheat steam by reheating the turbine steam 4 that is supplied from the superheater 9 through a high-pressure steam turbine 21 to be described below.

The steam power generation plant 1a includes a high-pressure steam turbine (high-pressure turbine) 21 and an intermediate-pressure steam turbine (intermediate-pressure turbine) 22. The high-pressure turbine 21 is rotationally driven by the turbine steam 4 (main steam) that is supplied from the superheater 9 of the boiler 6. The intermediate-pressure turbine 22 is connected to the high-pressure turbine 21 by a turbine shaft 20, and is rotationally driven by the turbine steam 4 (reheat steam) that is supplied from the high-pressure turbine 21 through the reheater 10 of the boiler 6. Further, a low-pressure steam turbine (low-pressure turbine) 23 is connected to the intermediate-pressure turbine 22 by the turbine shaft 20. The low-pressure turbine 23 is adapted to be rotationally driven by the turbine steam 4 supplied from the intermediate-pressure turbine (exhaust steam (intermediate-pressure exhaust steam) discharged from the intermediate-pressure turbine 22). Furthermore, a generator 24, which generates power by the rotation of the turbine shaft 20, is connected to the turbine shaft 20.

Meanwhile, in this embodiment, the rotating shafts of the high-pressure turbine 21, the intermediate-pressure turbine 22, the low-pressure turbine 23, and the generator 24 are connected to each other so as to form one turbine shaft 20. However, the embodiment is not limited to this structure. The steam power generation plant is may include two or more turbine shafts each which includes at least one steam turbine and a plurality of generators connected to the respective turbine shafts.

A condenser 26, which generates condensate 27 by cooling and condensing the turbine steam exhausted from the low-pressure turbine 23 (exhaust steam (low-pressure exhaust steam) exhausted from the low-pressure turbine 23) is provided below the low-pressure turbine 23. The condensate 27 discharged from the condenser 26 is sent to the downstream side of a line 28 by a condensate pump 31, and is sent to the boiler 6 through a line 33 by a water supply pump 34.

As shown in FIG. 1, the carbon dioxide recovery plant 1b is provided with a known carbon dioxide separation recovery apparatus 40 that is supplied with the exhaust gas 5 from the boiler 6 and separates and recovers carbon dioxide contained in the exhaust gas 5. The carbon dioxide separation recovery apparatus 40 includes an absorption tower (not shown) and a regeneration tower (not shown). The absorption tower allows carbon dioxide contained in the exhaust gas 5 to be absorbed in the carbon dioxide-absorption liquid. The regeneration tower is supplied with the absorption liquid (rich liquid) having absorbed carbon dioxide from the absorption tower, discharges a carbon dioxide gas 42 containing water vapor by allowing a carbon dioxide gas to be discharged from the rich liquid, and regenerates the absorption liquid. The absorption liquid, which is regenerated in the regeneration tower, is supplied to the absorption tower.

An amine compound aqueous solution, which is obtained by dissolving an amine compound in water, may be used as the absorption liquid that is used to absorb carbon dioxide.

The regeneration tower is provided with a reboiler 41. The reboiler 41 allows the temperature of a lean liquid to rise and generates steam by heating a part of the lean liquid (a regenerated absorption liquid of which carbon dioxide content is low) that is stored in the regeneration tower. Then, the reboiler 41 supplies the steam to the regeneration tower. When the lean liquid is heated in the reboiler 41, a carbon dioxide gas is discharged from the lean liquid and supplied to the regeneration tower together with the steam of the absorption liquid. The steam of the absorption liquid ascends in the regeneration tower, and heats the rich liquid. Accordingly, a carbon dioxide gas is discharged from the rich liquid. A heat source of the reboiler 41 will be described below.

The carbon dioxide gas 42, which contains water vapor and is discharged from the top portion of the regeneration tower, is supplied to a $CO_2$ condenser (condenser) 51. Water vapor 43, which is condensed by the $CO_2$ condenser 51, returns to the regeneration tower of the carbon dioxide separation recovery apparatus 40.

The condensate 27, which is branched from the line 28 on the downstream side of the condensate pump 31, is supplied to the $CO_2$ condenser 51 as cooling water, so that the carbon dioxide gas 42 containing water vapor is cooled. The temperature of the carbon dioxide gas 42 containing water vapor, which is discharged from the regeneration tower, is about 110° C. The carbon dioxide gas 42 containing water vapor is cooled by cooling water (a part of the condensate 27), so that the temperature of the carbon dioxide gas 42 containing water vapor is lowered to about 40° C. The cooling water (a part of the condensate 27) cools the carbon dioxide gas 42 containing water vapor, so that the cooling water becomes hot water 60 having a temperature of, for example, about 80° C. In other words, the cooling water (a part of the condensate 27) recovers heat from the carbon dioxide gas 42 containing water vapor that is discharged from the regeneration tower, so that the cooling water becomes hot water 60.

Carbon dioxide 52 of which the purity has been increased by the $CO_2$ condenser 51 is compressed to a high-pressure state (for example, about 8 MPa), which is suitable for injecting carbon dioxide into the ground, by compressors 53 and 54. After being cooled by an intermediate cooler 55, the carbon dioxide 52, which has been compressed by the compressor 53, is compressed by the compressor 54. Further, the carbon dioxide 52, which has been compressed by the compressor 54, is cooled by an outlet cooler 56. Since the intermediate cooler 55 and the outlet cooler 56 are provided as described above, it is possible to improve compression efficiency and to recover heat from the carbon dioxide 52 of which the temperature has been raised by compression.

Next, the heat source of the reboiler 41 will be described. As shown in FIG. 1, reboiler heating steam 18, which is extracted or exhausted from the high-pressure turbine 21, the intermediate-pressure turbine 22, or the low-pressure turbine 23, is supplied to the reboiler 41. After the temperature of the steam 18 is lowered to temperature, which is suitable to raise the temperature of the carbon dioxide-absorption liquid, by a desuperheater 44, the steam of which the temperature has been lowered is supplied to the reboiler 41. It is possible to switch steam, which is to be used as the steam 18 for heating the reboiler, to any one of the steam extracted or exhausted from the high-pressure turbine 21, the steam extracted or exhausted from the intermediate-pressure turbine 22, and the steam extracted or exhausted from the low-pressure turbine 23, by valves 37 to 39.

The hot water 60, which is generated by the $CO_2$ condenser 51, is supplied to the desuperheater 44, so that the hot water 60 is sprayed on the steam 18. Accordingly, the temperature of the steam 18 is lowered to temperature, which is suitable to raise the temperature of the carbon dioxide-absorption liquid.

Steam discharged from the reboiler 41 is joined to the line 28 as drainage at an appropriate position between the condensate pump 31 and the water supply pump 34.

As described above, in this embodiment, the heat of the carbon dioxide gas 42 containing water vapor, which is discharged from the regeneration tower, is recovered in the $CO_2$ condenser 51 by a part of the condensate 27, so that hot water 60 is generated. The hot water 60 is used to adjust the temperature of the steam 18 for heating the reboiler. Accordingly, the carbon-dioxide-recovery-type steam power generation system 1 can efficiently recover thermal energy that is generated while the carbon dioxide 52 is injected into the ground, and can achieve high thermal efficiency.

In the above-mentioned embodiment, it may be possible to adjust the amount of the hot water 60, which is sprayed on the steam 18 by the desuperheater 44, by a controller (not shown) on the basis of the temperature of the steam 18, which is required in the reboiler 41.

In each of the above-mentioned embodiments, two compressors for compressing carbon dioxide and two coolers for cooling the compressed carbon dioxide have been provided. However, one compressor and one cooler may be provided, or three or more compressors and three or more coolers may be provided.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A carbon-dioxide-recovery-type steam power generation system comprising:
   a boiler that generates steam through the combustion of fuel and generates an exhaust gas;
   an absorption tower that is supplied with the exhaust gas from the boiler, and allows carbon dioxide contained in the exhaust gas to be absorbed in an absorption liquid;

a regeneration tower that is supplied with the absorption liquid having absorbed carbon dioxide from the absorption tower, discharges a carbon dioxide gas from the absorption liquid, and discharges the carbon dioxide gas;

a reboiler that heats the absorption liquid discharged from the regeneration tower and supplies generated steam to the regeneration tower;

a turbine that is supplied with steam from the boiler and is rotationally driven;

a first condenser that generates condensate by cooling steam exhausted from the turbine;

a second condenser that is supplied with a part of the condensate as cooling water, condenses the carbon dioxide gas, and generates hot water; and a desuperheater that is supplied with the hot water, lowers the temperature of the steam exhausted from the turbine by spraying the hot water on the steam, and supplies the steam of which the temperature is lowered to the reboiler.

2. The carbon-dioxide-recovery-type steam power generation system according to claim 1, wherein the boiler includes a superheater that generates main steam and a reheater that generates reheat steam, the turbine includes a high-pressure turbine that is supplied with the main steam and rotationally driven, an intermediate-pressure turbine that is supplied with the reheat steam and rotationally driven, and a low-pressure turbine that is supplied with steam exhausted from the intermediate-pressure turbine and rotationally driven, and the desuperheater sprays the hot water on the steam that is exhausted from the high-pressure turbine, the intermediate-pressure turbine, or the low-pressure turbine.

3. The carbon-dioxide-recovery-type steam power generation system according to claim 1, further comprising:

a controller that controls the amount of the hot water, which is sprayed on the steam by the desuperheater, on the basis of the temperature of the steam that is required in the reboiler.

4. The carbon-dioxide-recovery-type steam power generation system according to claim 3, wherein the boiler includes a superheater that generates main steam and a reheater that generates reheat steam, the turbine includes a high-pressure turbine that is supplied with the main steam and rotationally driven, an intermediate-pressure turbine that is supplied with the reheat steam and rotationally driven, and a low-pressure turbine that is supplied with steam exhausted from the intermediate-pressure turbine and rotationally driven, and the desuperheater sprays the hot water on the steam that is exhausted from the high-pressure turbine, the intermediate-pressure turbine, or the low-pressure turbine.

5. The carbon-dioxide-recovery-type steam power generation system according to claim 1, further comprising:

a compressor that compresses the carbon dioxide gas condensed by the condenser; and a cooler that cools the carbon dioxide gas compressed by the compressor.

6. A carbon dioxide recovery method comprising:

generating steam, which drives a turbine, and generating an exhaust gas by a boiler;

allowing carbon dioxide contained in the exhaust gas discharged from the boiler to be absorbed in an absorption liquid in an absorption tower;

discharging a carbon dioxide gas from the absorption liquid having absorbed carbon dioxide in a regeneration tower and discharging the carbon dioxide gas;

heating the absorption liquid discharged from the regeneration tower and supplying generated steam to the regeneration tower by a reboiler;

generating condensate by cooling the steam, which is exhausted from the turbine, by a first condenser;

condensing the carbon dioxide gas by a second condenser while the second condenser uses a part of the condensate as cooling water, and generates hot water; and spraying the hot water on the steam exhausted from the turbine and supplying the steam to the reboiler.

7. The carbon dioxide recovery method according to claim 6, further comprising:

controlling the amount of the hot water, which is sprayed on the steam, on the basis of the temperature of the steam that is required in the reboiler.

* * * * *